M. A. AND L. M. ENDRES.
SECTIONAL WHEEL RIM.
APPLICATION FILED MAY 1, 1919.
1,337,446.
Patented Apr. 20, 1920.
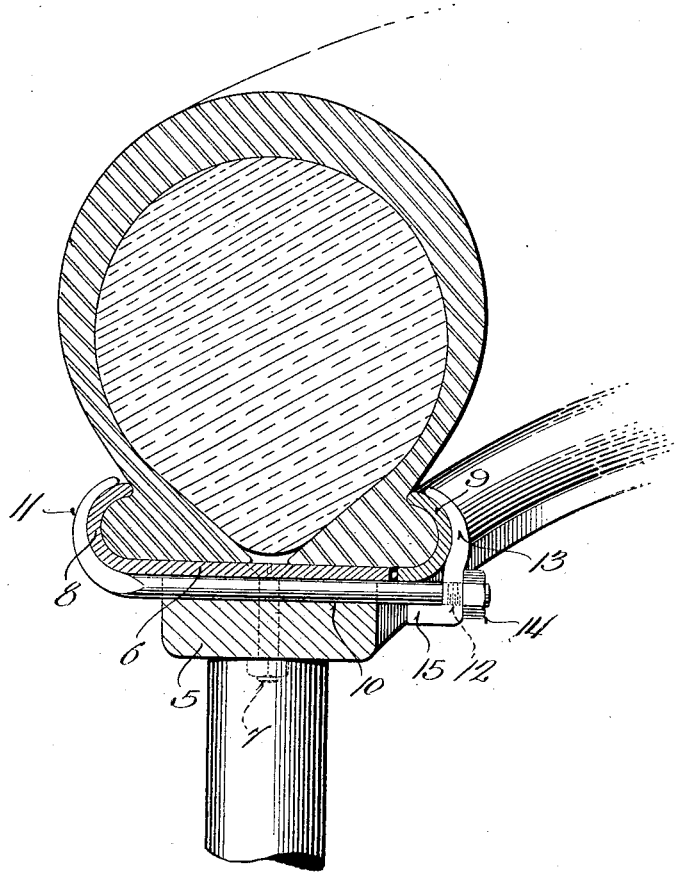

UNITED STATES PATENT OFFICE.

MICHAEL A. ENDRES AND LAWRENCE M. ENDRES, OF CROSS PLAINS, WISCONSIN.

SECTIONAL WHEEL-RIM.

1,337,446.  Specification of Letters Patent.  Patented Apr. 20, 1920.

Application filed May 1, 1919. Serial No. 294,119.

*To all whom it may concern:*

Be it known that we, MICHAEL A. ENDRES and LAWRENCE M. ENDRES, citizens of the United States, and residents of Cross Plains, in the county of Dane and State of Wisconsin, have invented certain new and useful Improvements in Sectional Wheel-Rims; and we do hereby declare that the following is a full, clear, and exact description thereof.

Our invention relates to new and useful improvements in sectional rims for pneumatic tires of automobiles or similar vehicles, and is more particularly directed to the provision of a sectional rim adapted for use in connection with tires having a filler of spongy or similar cushioning material wherein the operative compression of the tire filler must be procured as the tire is attached to the rim, although our improved sectional rim may also be used in connection with tires provided with the usual inner tube which is expanded subsequent to attachment of the tire to the rim.

It is in general the object of our invention to simplify and otherwise improve the structure and to increase the efficiency and convenience of operation of sectional tire rims.

It is more particularly our object to provide a sectional rim wherein means is provided for contracting the rim subsequent to the insertion of a tire therein whereby a snug fit may be procured with respect to tires having a spongy rubber or similar filler.

A further object resides in the provision of an arrangement wherein the compression stresses incidental to contraction of the rim are transmitted directly from one side edge portion of the rim to the other.

A still further object resides in the provision of a sectional rim embodying the foregoing characteristics which may be readily formed from the conventional one-piece rims now on the market.

With the above and other objects and advantages in view, which will be apparent as the description proceeds, our invention resides in the novel features of construction, combination and arrangement of parts which will be hereinafter more particularly described and defined by the appended claim.

In the accompanying drawing:

The figure is a sectional perspective view of a wheel rim structure embodying our invention.

Referring now more particularly to the accompanying drawings, 5 designates the ordinary felly of a wheel for automobiles or similar vehicles and secured on this felly is the major section 6 of my improved sectional rim, the said securement being effected by bolts 7 passed through the felly and having their heads countersunk in the central portion of the rim. The major section of the rim includes the transversely flat intermediate rim portion which is bent at one side to provide the usual curved clencher flange 8 and which has its other side terminating in the plane of the intermediate rim portion, preferably slightly outwardly of the side of the felly. The minor section 9 of the rim is substantially U-shape in cross section and forms the other clencher flange of the rim, its inner edge being adapted for abutting engagement with the straight edge of the major rim section. The body sections of my improved sectional rim may thus be formed from the one-piece rim found on various makes of cars, although the structure described lends itself to ready manufacture.

These rim sections are detachably connected by bolts 10 passed transversely through the felly 5 and engaging the inner periphery of the rim. One end of each of the bolts terminates in an outwardly curved head 11 fitting against and embracing the clencher flange 8 of the major rim section 6. The other end of the bolt is threaded and adapted to engage in the aperture 12 of a follower plate 13 which is curved to fit against and embrace the minor rim section 9. A nut 14 is threaded on the bolt outwardly of the plate for drawing the rim sections together, and twisting stresses on the follower plate 13 incidental to this drawing action and the outward pressure of the confined tire material are relieved by an inward extension 15 on the follower plate which bears against the inner side of the bolt.

An exceedingly simple structure is thus provided wherein the various stresses incidental to the mounting of the tire as distributed in such manner as to impart a maximum strength to the rim structure by the connection of the bolt ends with the relatively strong flange portions of the rim.

In mounting within the rim a tire having a filler of spongy rubber or similar material, the sections of the rim are spaced slightly apart. The tire is then inserted in the rim under considerable transverse compression by the usual prying operation. The bolts 14 are then tightened to draw the rim sections into abutment and thus take up the looseness which would otherwise occur incidental to the expansion of the tire casing in the clencher spaces of the rim. Tires having the usual inner tubes may be associated with the rim in the ordinary manner.

While we have shown and described our invention as associated with a rim of the clencher type, it will also be appreciated that a rim of the straight side type may be provided, the essential feature being that the bolts 10 have connection with the flange side portions of the rim. It will also be appreciated that various other changes and modifications of structure to meet differing conditions of use and manufacture may be employed without departing in any manner from the spirit of our invention.

What is claimed is:

In combination, a felly, a tire holding rim comprising a major section having an annular axially positioned portion secured to the periphery of the felly and an outwardly radially projecting tire retaining flange formed on one edge of the annular portion, the other edge of the latter being plain, and a minor section having one plain edge for abutting engagement with the last mentioned edge of the major section and including an outwardly radially projecting tire retaining flange, a plurality of rim retaining devices, one comprising a bolt extending through the felly transversely thereof and substantially parallel and in close proximity to the annular portion of said major section, a laterally projecting head on one end of said bolt engageable with the first mentioned tire retaining flange, a follower slidable on the other end of the bolt, said follower consisting of a right angular member, one arm being longer than the other for engagement with the second mentioned tire retaining flange, said long arm having a transverse bolt receiving opening disposed at the junction of the two arms and having its axis extended in the direction of the short arm, said short arm being engageable with the bolt, and means on the bolt for moving the follower longitudinally of the latter and the long arm into engagement with the second mentioned tire retaining flange.

In testimony that we claim the foregoing we have hereunto set our hands at Cross Plains, in the county of Dane and State of Wisconsin.

MICHAEL A. ENDRES.
LAWRENCE M. ENDRES.